(12) United States Patent
Gerwitz

(10) Patent No.: US 6,345,950 B1
(45) Date of Patent: Feb. 12, 2002

(54) TELESCOPING RAMP COMPRISED OF MODULAR UNITS

(76) Inventor: William Gerwitz, 11111 Biscayne Blvd., Miami, FL (US) 33181

(*) Notice: Subject to any disclaimer, the term of this patent is extended or adjusted under 35 U.S.C. 154(b) by 0 days.

(21) Appl. No.: 09/517,994

(22) Filed: Mar. 3, 2000

(51) Int. Cl.$^7$ .............................................. E01D 15/12
(52) U.S. Cl. ........................................ 414/537; 14/71.1
(58) Field of Search ................................ 414/537, 538; 14/69.5, 71.1; 296/61

(56) References Cited

U.S. PATENT DOCUMENTS

| | | | | |
|---|---|---|---|---|
| 5,077,852 A | * | 1/1992 | Karlsson | 414/537 X |
| 5,803,523 A | * | 9/1998 | Clark et al. | 414/537 X |
| 5,813,071 A | * | 9/1998 | Breslin et al. | 414/537 X |
| 5,893,698 A | * | 4/1999 | Dick | 414/537 X |
| 5,933,898 A | * | 10/1999 | Estes et al. | 14/69.5 |

* cited by examiner

Primary Examiner—Frank E. Werner

(57) ABSTRACT

A ramp assembly for spanning between a first lower surface and a second relatively elevated upper surface defined by a structure having at least two elongated runners in telescoping relation relative to each other. The ramp assembly includes at least two elongated runners, preferably formed of a light weight structural plastic or aluminum, and an angular support member integral with each end of each runner for engaging the upper surface and lower surface of a platform. Thus, upon extension and placement of the ramp assembly in an inclined orientation relative to such platforms, each end thereof forms a secure and slip resistant attachment to such platform. The assembly can also include an additional runner disposed intermediate between each of the two runners. In this latter assembly configuration, each of two end runners are similarly configured, relative to said intermediate runner, to engage and support the intermediate runner, both in the compact and extended configuration. The ramp surface finish is textured or covered with a slip resistance material to afford traction and thereby controlled access and egress between the surfaces at either end thereof.

4 Claims, 4 Drawing Sheets

TELESCOPING RAMP COMPRISED OF MODULAR UNITS

BACKGROUND OF THE INVENTION

1. Field of the Invention

The present invention relates to a device for spanning between vertically spaced, upper and lower surfaces and, more particularly, to a modular, telescoping ramp for spanning vertically spaced, upper and lower surfaces. The device of this invention is comprised of multiple modular units that slideable extend and retract relative to one another to provide a self supporting span that can be readily adjusted, on site, to span the vertical and horizontal distances between two remote surfaces.

2. Description of the Prior Art

Ramps are routinely used to span between vertically spaced, upper and lower surfaces, such as the ground and a relatively elevated top surface of a structure, and thereby provide ease of access to and from the upper surface. Of course, ramps allow a person to slide or move an item along an inclined surface, rather than having to hoist or lift the item between the vertically spaced surfaces. Consequently, ramps are commonly used in construction sites so that materials, machinery and the like are relatively effortlessly raised and lowered between vertically spaced surfaces. Ramps are also often used to by-pass stairs or provide wheelchair access between two vertically spaced surfaces. Moreover, ramps are becoming increasingly popular with pickup truck and van owners. In this latter respect, the ramp allows the pickup owner to load the bed of the truck with items, such as motorcycles and lawnmowers, with relative ease. Other typical uses for a ramp include providing animal (pet) access to and from a conveyance; and, in the latter instance, typically include sturdy support and traction to afford a secure footing over the length of the span.

Traditionally ramps are secured to the upper surface in a manner that prevents the ramp from disconnecting from the upper surface and falling to the lower surface. For example, the upper end of the ramp may be permanently affixed to the upper surface by mechanical fasteners. However, in many instances, the ramp must be removable so that it permit it to be stowed once access to the upper surface is no longer needed. Additionally, it is often important that the ramp be highly portable so that it may be manually maneuvered, installed and removed. Moreover, where the ramp is to be use to permit ease of access to and from the tailgate of a pickup or floor of a van, the means used to afford attachment thereto must achieve this result without alteration or damage to the surface of the vehicle.

OBJECTS OF THE INVENTION

It is the object of this invention to remedy the above as well as related deficiencies in the prior art.

More specifically, it is the principle object of this invention to provide a ramp assembly for spanning between vertically spaced, upper and lower surfaces, that is safe and sturdy, yet quickly removable and highly portable.

It is another object of this invention to provide to provide a ramp assembly that is secured in its inclined orientation without damaging or permanently altering the upper surface.

It is yet another object of this invention to provide a ramp assembly of modular construction that can be extended and retracted over a relatively long span and thereby afford sturdy and secure footing between an upper and lower surface, or a flight of stairs.

Additional objects of this invention include a method for spanning a distance between two remote surfaces.

SUMMARY OF THE INVENTION

The above and related objects are achieved by provision of a ramp assembly for spanning between a first lower surface and a second relatively elevated upper surface. This assembly is defined by a structure, which may be gravity deployed by simply tilting to allow for sliding extension of the ramp; and, thereafter secured in an inclined orientation without damaging or permanently altering the upper surface. The ramp assembly of this invention is suitable for providing a safe and secure slip resistance span between virtually any loading and unloading platform. In the context of this invention, it is understood that the term "platform" is inclusive of the bed or interior of a truck or van, and any surface that is above or below the surface of the bed or interior of a truck or van. Accordingly, one such platform can be a conveyance (truck or van), or the landings at the top and the bottom of a flight of stairs.

The ramp assembly includes at least two elongated runners, preferably formed of a light weight structural plastic or aluminum, and an angular support member attached to, or integral with each end of each runner, and having a first portion thereof configured for engaging the upper surface and lower surface. Upon deployment and placement of the ramp assembly in an inclined orientation, each angular support member engages the upper and lower surfaces at an inclined angle relative to the ramp surface. The assembly can also include an additional runner disposed intermediate between each of two supporting runners that engage the upper and lower surfaces (hereinafter also "top" and "bottom" runners, or "end" runners), respectively. Each of two "top" and "bottom" runners are similarly configured, relative to said intermediate runner, to slidingly engage and support the intermediate runner, and thereby allow for cooperative reciprocal (telescoping) extension and retraction thereof.

In order to insure secure footing on the inclined surfaces of the ramp, the surface of the ramp can be textured in the course of manufacture, or a tread or carpet-like material added to improve traction.

In the preferred embodiments of the ramp assembly of this invention, the slide & channel configuration is design to minimize frictional forces upon deployment (extension) of the ramp, and yet provide positive locking of the ramp once weight is exerted upon the extended ramp surface. In another of the preferred embodiments, the slide and channel configuration is provided with an adjustable/moveable stop, to permit extension of the runners to a predetermined length, and thereby avoid the need to adjust the angle or distance between the upper and lower surface for each use.

DESCRIPTION OF THE INVENTION INCLUDING PREFERRED EMBODIMENTS

Figure 1A:
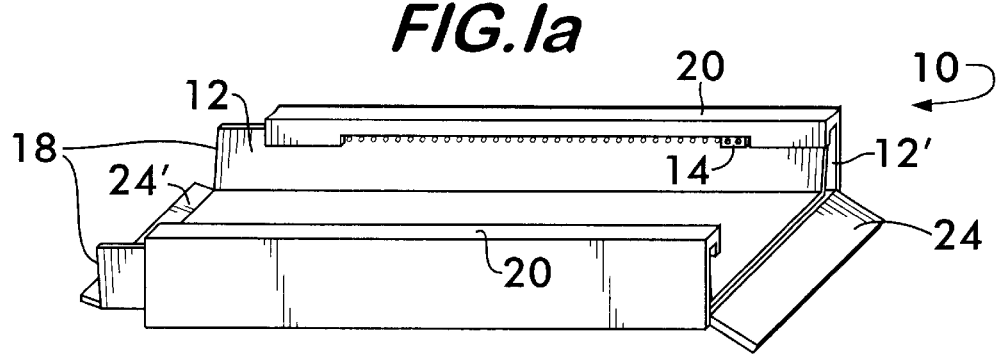
FIG. 1 is a perspective view of a ramp assembly constructed in accordance with the preferred embodiments of the invention, particularly illustrating the ramp assembly in its compact(FIG. 1A), sliding (FIG. 1B) and extended positions(FIG. 1C).
Figure 1B:
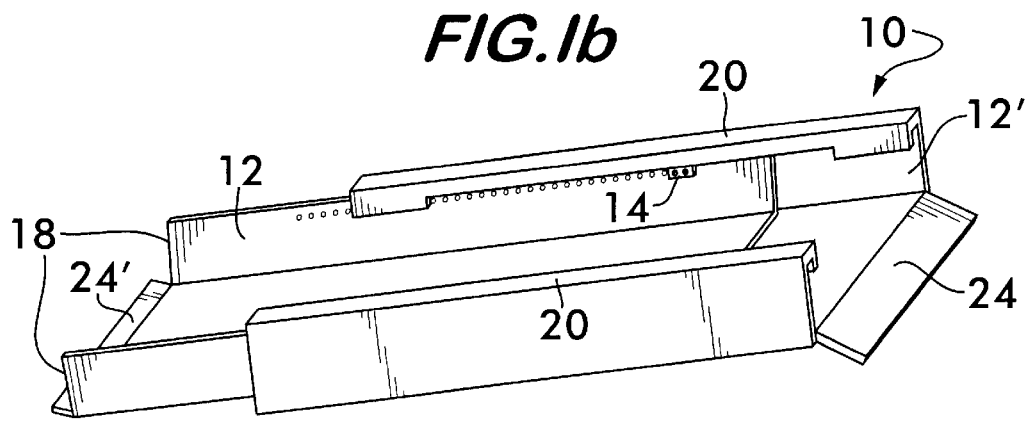
Figure 1C:
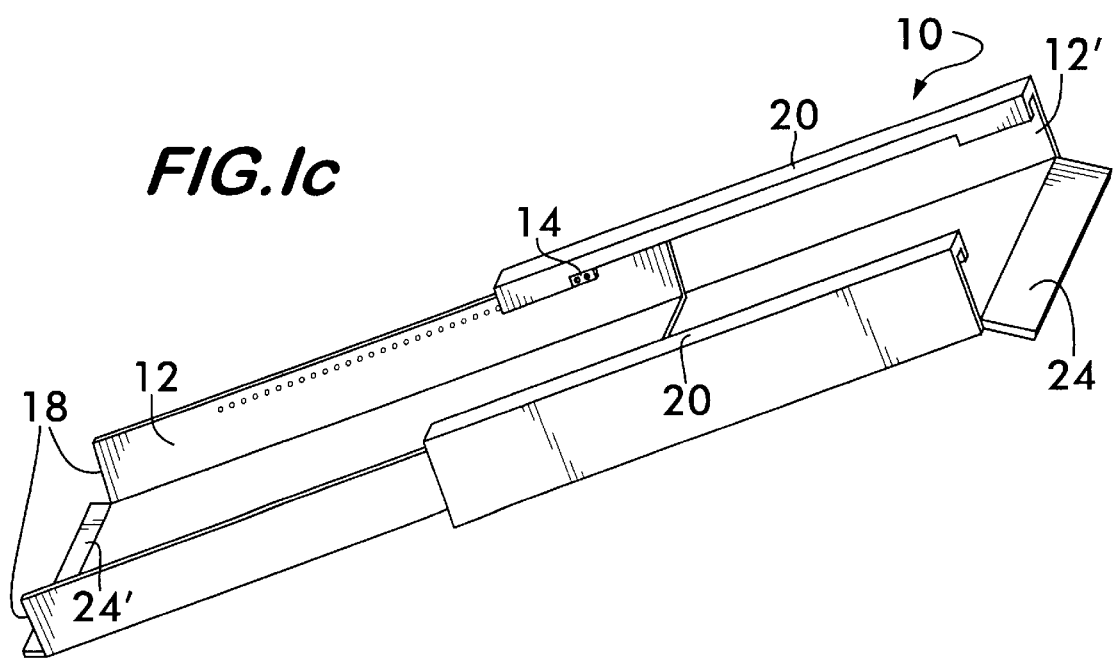
Figure 2:
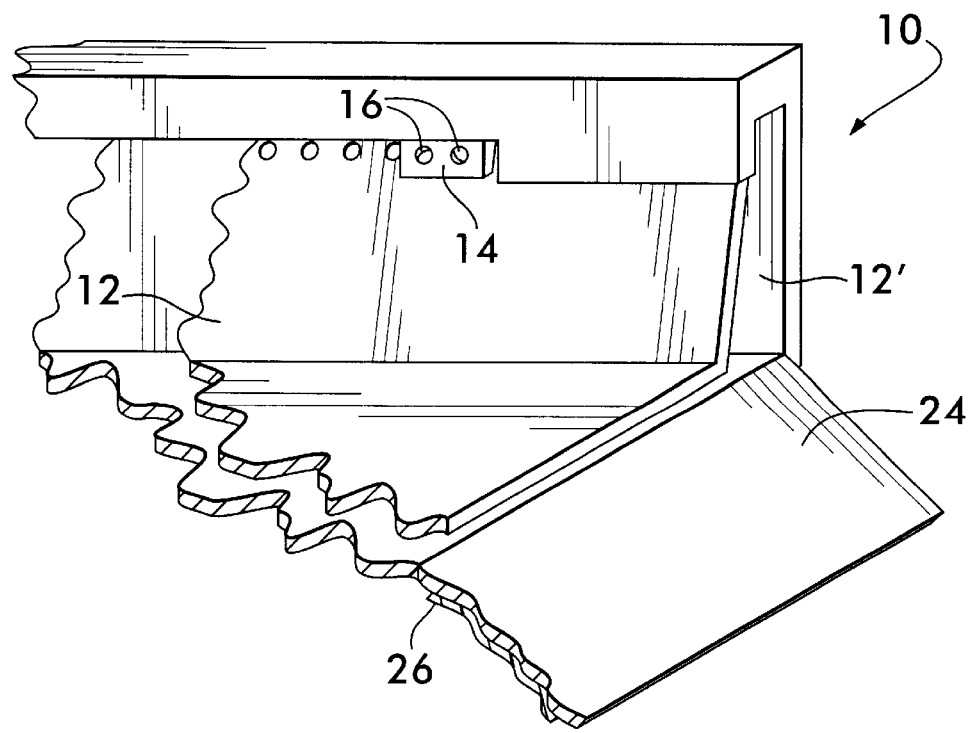
FIG. 2 is an enlarged, fragmentary, perspective view, particularly illustrating the adjustable stop for limiting the extension of a runner of the assembly in the extended positions.

Turning now to the drawings, FIG. 1 depicts a series of ramp assemblies depicted, each being denoted by the numeral 10, (and constructed in accordance with the principles of the present invention), at various stages of extension of each of the complimentary runners (12, 12'). More specifically, the ramp assembly, by design, is compact, light weight and readily transportable so as to be useful in the facilitation of loading (unloading) or boarding from a vehicle or other conveyance. Thus, prior to use the each of the complimentary runners (12, 12') of the ramp assembly are "compacted" (by relative reciprocal movement therebetween) to minimize space for storage and transport; and, thereafter, each of the runners (12, 12') of the ramp are permitted to extend or telescope (as shown in FIG. 1 (b)(c)) to a predetermined length to form a span or bridge between two remote surfaces. Prior to, or concurrent with the deployment of the assembly the length of the ramp, the assembly can be adjusted/limited by the positioning of a "stop" (14) located on or within the track/channel which is coincident to each of the runners (12, 12'). Thus, when the ramp assembly is deplored by extension of each of the runners (12, 12') of the assembly it forms a span of a predetermined length. The ramp is then placed on each of the remote surfaces to be joined to permit loading/unloading therebetween at the time of use, FIG. 2 depicts one of the embodiments of the invention wherein an adjustable stop is placed on the inside track of a runner. The stop (14) is shown to releasable attached to the channel with a pair of pins or screws (16), however, any fastener that is compatible with this purpose can be used.

Figure 3:
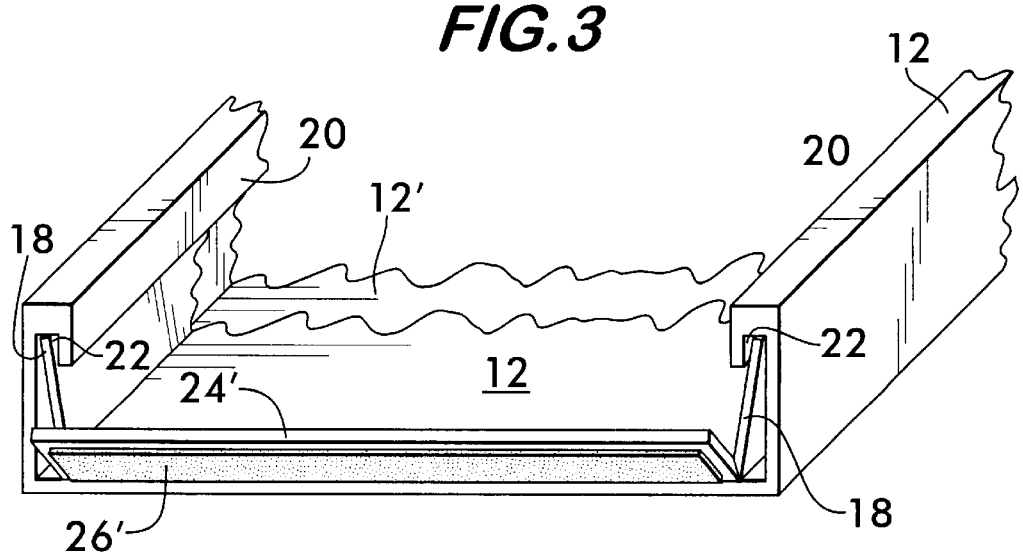
FIG. 3 is an enlarged fragmentary, perspective view of the of the bottom section of the ramp assembly, particularly illustrating the sliding engagement of each of the complimentary sections of each section of the ramp assembly relative to the other.

FIG. 3 depicts an end on view of track (18) & channel (20) configuration for a given pair of runners (12, 12') of one of the preferred embodiments of the ramp assembly of this invention, more particularly, a track/channel arrangement wherein each of the tracks (18) of a given runner (12) are inclined at least 5 degrees, and preferably less than 30 degrees, from the vertical plane relative to the complementary channel (20) of the other runner (12') of the assembly pair. The relative angle of the track to the channel is designed to minimize frictional contact therebetween and thereby prevent binding or entrapment of debris therebetween which is essential for ease of deployment. Moreover, the off-set or space (22) created between each of the tracks (18) and channels (20) for a given pair of runners (12, 12') by this arrangement, reduces the mechanical stresses between these two components, and thereby extends the useful life thereof.

Figure 4:
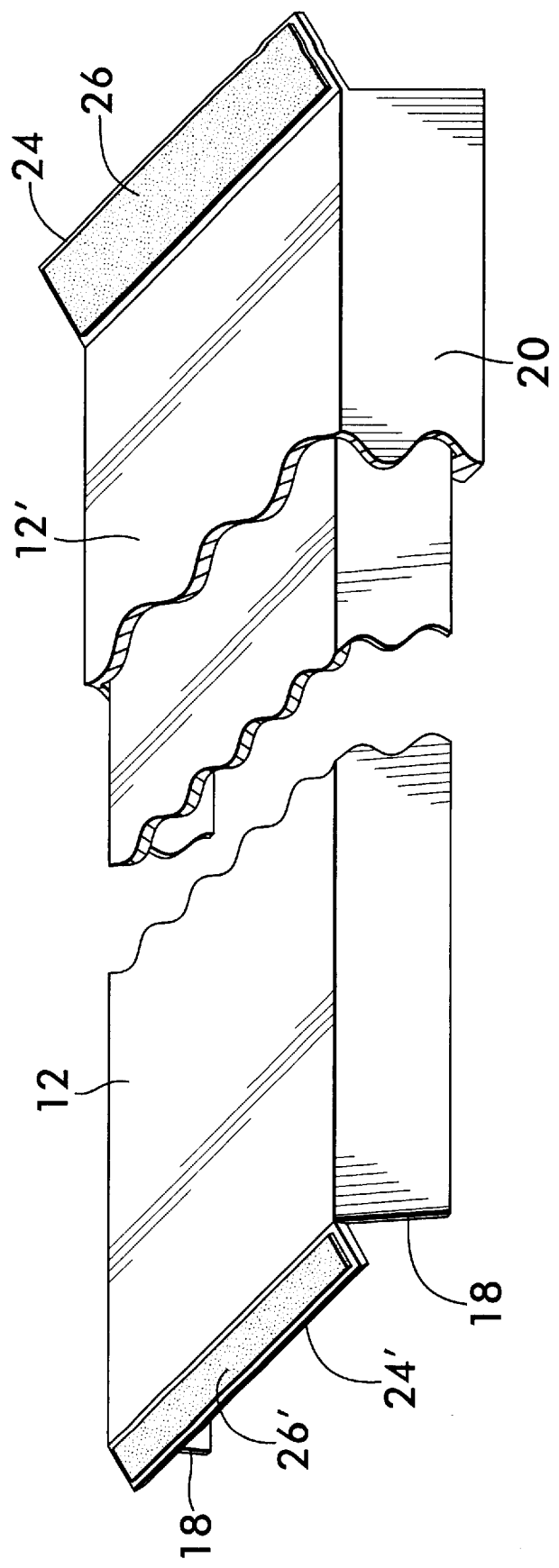
FIG. 4 is enlarged fragmentary, perspective view of each of the angular extensions of the top (FIG. 4A) and bottom (FIG. 4B) sections of the assembly, when viewed from below, particularly illustrating the non-skid traction pads on the underside of each of these angular extension.

FIG. 4 depicts a fragmentary view of each of the top and bottom runners (12, 12') of the ramp assembly, when viewed from the underside thereof. In the context of this invention, the end of the ramp (24), denominated as the "top", is designed/intended for placement on the elevated surface, and the other end (24') of the ramp, denominated as the "bottom", is designed/intended for placement upon the lower surface. Each of the angular extensions (24, 24') of the top and bottom sections of the ramp, respectively, are provided, on the underside support surfaces, with means (26, 26') (e.g. a slip resistant material) for inhibiting movement of the ends of the ramp from each of these support surfaces, (e.g. loading and unloading platforms) which are intended for contact with each such support surfaces.

Figure 5:
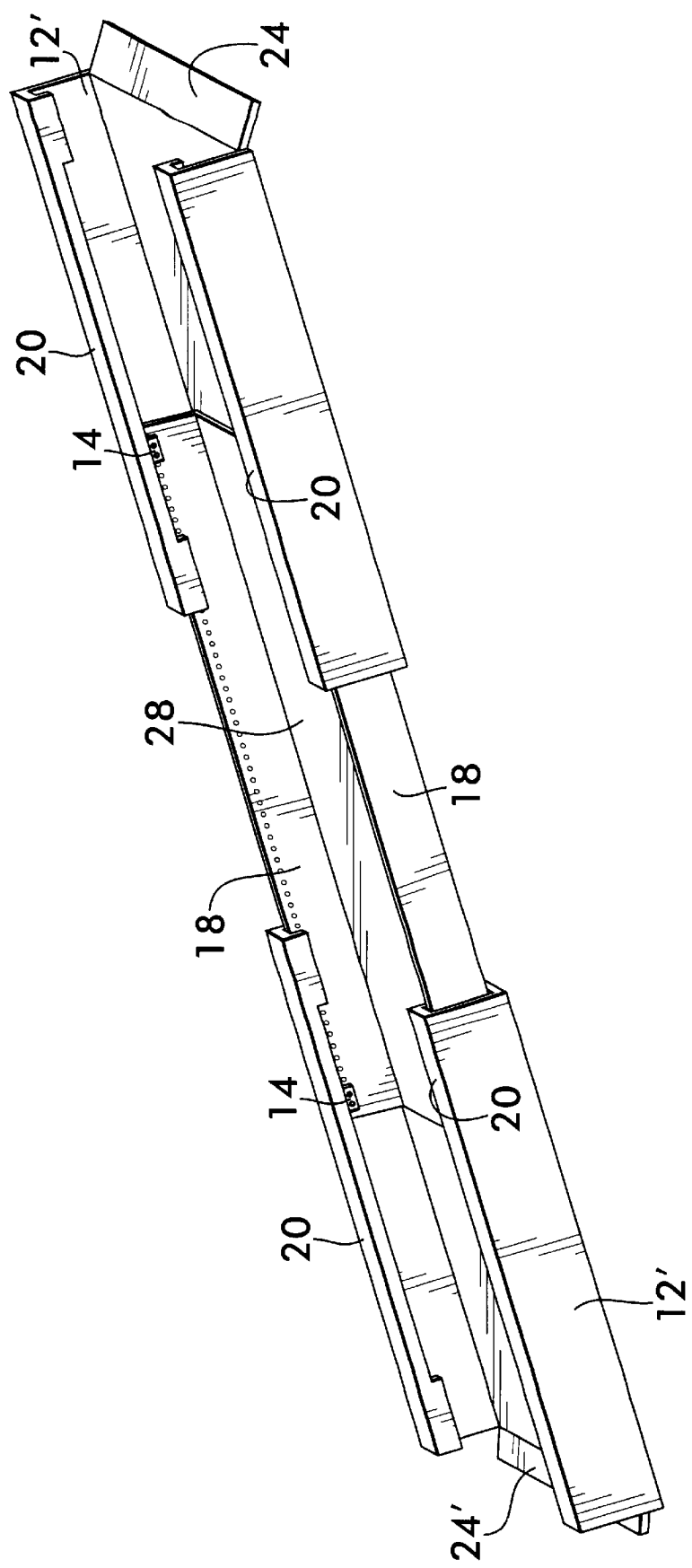
FIG. 5 is a perspective view of a ramp assembly constructed in accordance with the preferred embodiment of the invention, particularly illustrating the ramp assembly having a third section intermediate between the top and bottom sections of the assembly.

FIG. 5 depicts an enhancement to the ramp assembly of FIG. 1, more particularly, the addition of an intermediate runner section (28) between a top and a bottom runners (12, 12') of the assembly. The track/channel arrangement of each of these three components are similar to that described above, except that each of the top and bottom runners is provided with channels (20) for sliding engagement of the track (18) of the intermediate runner. The combined length of this assembly is predetermined as before by placement of at least one, and preferably two, adjustable stops on the track of the intermediate runner so as configure the assembly, once deployed, to span a defined distance or length.

A retractable hand-rail (not shown) can also be added to the ramp assembly to provide additional support and security for elderly individuals. Where the ramp is to be used for loading or unloading of animals, the retractable hand-rail can be replaced by retractable "fence" to prevent the animal from attempting to jump off the ramp before it reaches the bottom thereof.

Other enhancements and embodiments of this invention shall depend, to a degree, upon the various applications and uses of the ramp assemblies of this invention.

What is claimed is:

1. In a ramp assembly having a plurality of interlocking, telescoping runners wherein each of said runners of said assembly slidingly engaged another so as to permit relative, reciprocal extension and retraction therebetween, wherein the improvement comprises:

a modular ramp assembly having at least two elongated runners, wherein each of said runners, slidingly engage a complementary member along each lateral border thereof so as to permit reciprocal extension and retraction of a member of a runner pair relative to another member of said runner pair upon placing said assembly in an inclined position, wherein each complementary runner of said runner pair comprises a load bearing surface and interlocking profiles formed along each of said lateral borders of a runner surface, said interlocking profiles including a relatively flexible track or a relatively, non-confining channel formed along each lateral border of each member of said runner pair, so as to permit both (a) gravity deployment and extension of one runner relative to another upon inclination of the ramp and (b) binding engagement therebetween upon application of weight to said load bearing surface of said runner, so as to lock or arrest relative movement of said complementary runners in an extended position, independent of a channel stop, said channel of said runner of said runner pair having a cross-sectional profile suitable for engaging a complementary track of another member of said runner pair without substantially confining movement of said track within said channel; and said track of said runner of said runner pair, being integral with said runner, and having a cross-sectional profile that is inclined less than 30 degrees to the vertical, relative to said cross-sectional profile of said channel of said runner of said complementary runner pair, so as to permit engagement and positive locking of said track within said channel in an extended position, without aid of a channel stop, upon application of weight on said load bearing surface of said runner.

2. The improvement of claim 1, wherein said ramp assembly includes an intermediate runner between each member of a complementary pair of telescoping runners, said intermediate runner being further characterized as having a track or channel for sliding engagement to each member of said complementary pair of telescoping runners so a to provide for additional extension therebetween.

3. The improvement of claim 1, wherein said ramp assembly includes at least one adjustable stop for limiting extension of said telescoping runners to a predetermined length.

4. The improvement of claim 1, wherein said ramp assembly includes means for enhancement in slip resistance of said runner surfaces.

* * * * *

UNITED STATES PATENT AND TRADEMARK OFFICE
CERTIFICATE OF CORRECTION

PATENT NO.    : 6,345,950 B1  
DATED         : February 12, 2002  
INVENTOR(S)   : William Gerwitz It is certified that error appears in the above-identified patent and that said Letters Patent is hereby corrected as shown below:

<u>Title page,</u>
Item [75], Inventor, change the Inventor's surname from "Gerwitz"
to -- Gerwirtz --

Signed and Sealed this

Eleventh Day of May, 2004

JON W. DUDAS  
*Acting Director of the United States Patent and Trademark Office*